UNITED STATES PATENT OFFICE 2,623,046

ESTERS OF ACRIDAN-10-CARBOXYLIC ACID AND METHODS FOR PRODUCING THE SAME

John W. Cusic, Skokie, Ill., assignor to G. D. Searle & Co., Chicago, Ill., a corporation of Illinois No Drawing. Application February 7, 1951, Serial No. 209,917

18 Claims. (Cl. 260—247.2)

The present invention is concerned with a new type of ester of carbamic acid, wherein the nitrogen in the carbamic acid is a part of a cyclic radical, and more particularly with the esters of acridan-10-carboxylic acid; such esters may be represented by the structural formula

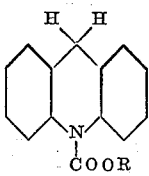

In this structural formula, the radical R may be a lower alkyl radical or a substitution product thereof.

I have found that esters of particular medicinal interest are obtained where the R radical is a basically substituted alkyl radical of the type

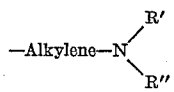

In this latter formula, alkylene represents such bivalent saturated aliphatic hydrocarbon radicals as ethylene, trimethylene, tetramethylene, pentamethylene, hexamethylene, propylene, butylene, amylene, and hexalene, as well as more highly branched forms isomeric thereto. R' and R'' may represent such lower alkyl radicals as methyl, ethyl, propyl, butyl, amyl, and hexyl, wherein the propyl, butyl, amyl, and hexyl radicals may be either of the straight-chain, branched-chain, or cyclic type. The radical

may also represent a nitrogen containing radical such as piperidine, lupetidine, pyrrolidine, morpholine, thiamorpholine, quinoline, isoquinoline, piperazine, N'-alkylpiperazine and the like.

The organic bases of the foregoing type form salts with a variety of inorganic and strong organic acids including sulfuric, phosphoric, hydrochloric, hydrobromic, sulfamic, citric, oxalic, ascorbic and related acids. They also form quaternary ammonium salts with a variety of organic esters of the sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzene sulfonate, ethyl toluene sulfonate, ethylene chlorohydrin, propylene chlorohydrin, allyl bromide, methallyl bromide and crotyl bromide.

The object of this invention is to provide novel esters of acridan-10-carboxylic acid. Certain of these esters are valuable intermediates in organic synthesis. Some of them, and particularly the basically substituted alkyl derivatives, have been found to possess a number of highly useful pharmacodynamic properties. These have a profound effect upon the cardiovascular system, producing vasodilation. Quaternary ammonium derivatives have been found to inhibit the transmission of nerve impulses through the autonomic nervous system. Certain others of these esters are valuable as active ingredients in parasiticidal compositions of matter.

In one of the preferred methods for the preparation of these acridan-10-carboxylates, acridan is heated with an ester of chloroformic acid and an alcohol. If a halogen substituted alcohol is used, one obtains an ester of the type

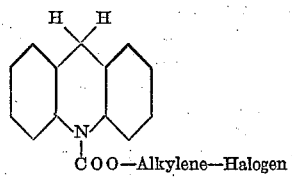

This ester can then be converted to a basic derivative of the type discussed herein above by treatment with a suitable amine. An alternative approach to such ester, utilizes the reaction product of acridan and phosgene, i. e. acridan-10-carboxylic acid chloride, which is treated with a suitable alcohol to form esters in the usual way.

My invention will be described more fully in conjunction with the following examples. It should be understood, however, that these examples are given by way of illustration only and that the invention is not to be construed as limited in spirit or in scope by the details set forth. It will be apparent to those skilled in the art that many modifications in materials and methods may be made without departing from the invention. In each of these examples, temperatures are given uncorrected in degrees centigrade (° C.), and quantities of material as parts by weight.

EXAMPLE 1

β-Chloroethyl ester of acridan-10-carboxylic acid

A mixture of 905 parts of acridan and 715 parts of the chloroformate of β-chloroethanol in 8700 parts of anhydrous toluene is heated at refluxing temperature for 10 hours. After cooling, the reaction mixture is stirred with charcoal and filtered. The clear filtrate is evaporated and the greenish solid residue is recrystallized from ethanol. The chloroethyl ester of acridan-10-carboxylic acid melts at about 106–108° C.

EXAMPLE 2

β-Dimethylaminoethyl ester of acridan-10-carboxylic acid 286 parts of the chloroethyl ester of acridan-10-carboxylic acid are heated with 200 parts of dimethyl amine, 800 parts of butanone, and 10 parts of potassium iodide in a shielded pressure reactor at 65° C. for four days. The excess of amine and the solvent are removed by heating on the steam bath. Upon addition of a mixture of dilute hydrochloric acid and ether, a yellow crystalline hydrochloride precipitates which is collected on a filter. The hydrochloride of the β-dimethylaminoethyl ester of acridan-10-carboxylic acid melts at about 204-205° C. It has the structural formula

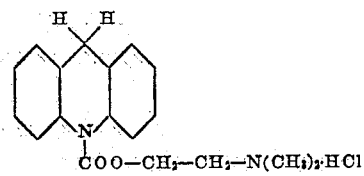

EXAMPLE 3

β-Diethylaminoethyl ester of acridan-10-carboxylic acid 330 parts of chloroethyl ester of acridan-10-carboxylic acid are heated with 250 parts of diethyl amine and 880 parts of benzene in a shielded pressure vessel at 80° C. for four days. After evaporation of most of the solvent, the residue is treated with hydrochloric acid, ether, and benzene. The acid layer is separated, rendered alkaline by addition of dilute sodium hydroxide, and extracted with a mixture of ether and benzene. The extract is dried over anhydrous potassium carbonate, filtered, and evaporated. The product consisting of an oily base remains.

EXAMPLE 4

Acridan-10-carboxylate of diethylmethyl-(β-hydroxyethyl)-ammonium bromide 70 parts of β-dimethylaminoethyl ester of acridan-10-carboxylic acid are reacted with 87.5 parts of methyl bromide in 400 parts of butanone in a shielded pressure vessel. A solid precipitate forms within a few minutes. The acridan-10-carboxylate of diethylmethyl-(β-hydroxyethyl)-ammonium bromide thus formed melts at about 220–221° C. with decomposition. The product has the structural formula

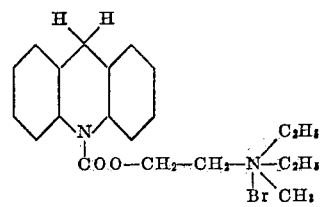

EXAMPLE 5

β,β-Dimethyl-γ-diisopropylaminopropyl ester of acridan-10-carboxylic acid 360 parts of acridan are heated at refluxing temperature with 480 parts of γ-bromo-β,β-dimethylpropyl chloroformate in 5000 parts of anhydrous toluene for twelve hours. The solution is filtered using charcoal as a clarifying agent. Upon distillation of the solvent, the β,β-dimethyl-γ-bromopropyl ester of acridan-10-carboxylic acid is obtained. 500 parts of this ester are heated with 300 parts of diisopropylamine, 10 parts of potassium iodide and 2000 parts of butanone in a shielded reactor at 65° C. for five days. The excess of amine and of solvent are removed by heating on a steam bath. Dilute hydrochloric acid, ether and benzene are added to the residue and the acidic layer is separated and rendered alkaline by addition of dilute sodium hydroxide. The base thus obtained is extracted with ether. The ether extract is dried over anhydrous potassium carbonate, stirred with charcoal, and filtered. Upon filtration, the β,β-dimethyl-γ-diisopropylaminopropyl ester of acridan-10-carboxylic acid is obtained in the form of colorless crystals. It has the formula

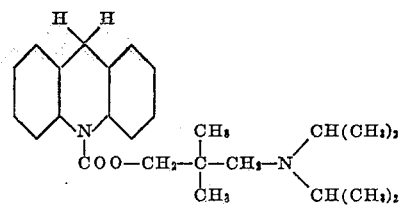

EXAMPLE 6

N - (β - hydroxyethyl - N - methylaminoethanol ester of acridan-10-carboxylic acid 286 parts of the chloroethyl ester of acridan-10-carboxylic acid are heated at refluxing temperature with 225 parts of N-methylaminoethanol, 10 parts of potassium iodide and 1600 parts of butanone. Most of the solvent is then distilled off and a mixture of dilute hydrochloric acid, ether and benzene is added. The acid layer is separated and rendered alkaline with ammonium hydroxide. An oil separates. The N-(β-hydroxyethyl)-N-methylaminoethanol ester of acridan-10-carboxylic acid is extracted with a mixture of ether and benzene. The extract is dried over anhydrous potassium carbonate, filtered and evaporated.

The hydrochloride is obtained by treatment of a solution of the base in a mixture of benzene and ether with alcoholic hydrogen chloride. The resulting precipitate is separated and recrystallized from isopropanol. The hydrochloride thus obtained melts at about 174–175° C. It has the structural formula

[structural formula: acridan-10-carboxylic acid ester, COO—CH₂—CH₂—N(CH₃)—CH₂—CH₂OH·HCl]

EXAMPLE 7

β-Morpholinoethyl ester of acridan-10-carboxylic acid 286 parts of the chloroethyl ester of acridan-10-carboxylic acid are heated with 200 parts of morpholine, 10 parts of potassium iodide and 1600 parts of butanone for ten hours at the refluxing temperature. The reaction mixture is concentrated on the steam bath. Addition of dilute hydrochloric acid to the residue yields a solid precipitate which is filtered off. The filtrate is rendered alkaline whereupon the β-morpholinoethyl ester of acridan-10-carboxylic acid precipitates. The latter is collected on a filter and washed with water. It is recrystallized from ethanol using charcoal as a clarifying agent. The crystals melt at about 124–125° C.

I claim:
1. Esters of acridan-10-carboxylic acid of the class consisting of lower alkyl, lower haloalkyl and lower basically substituted alkyl esters.
2. Basically substituted esters of acridan-10-carboxylic acid of the structural formula

[structural formula with COOR]

wherein R is a basically substituted lower alkyl radical.

3. The lower dialkylaminoalkyl esters of acridan-10-carboxylic acid of the structural formula

[structural formula with COO—Alkylene—N(Alkyl)(Alkyl)]

4. The lower dialkylaminoethyl esters of acridan-10-carboxylic acid of the structural formula

[structural formula with COO—CH₂—CH₂—N(Alkyl)(Alkyl)]

5. Acridan-10-carboxylates of lower hydroxyalkyltrialkylammonium salts of the structural formula

[structural formula with COO—Alkylene—N⁺(Alkyl)(Alkyl)(Alkyl) X⁻]

wherein X is one equivalent of an anion.

6. Acridan-10-carboxylates of lower β-hydroxyethyltrialkylammonium salts of the structural formula

[structural formula with COO—CH₂—CH₂—N⁺(Alkyl)(Alkyl)(Alkyl) X⁻]

wherein X is one equivalent of an anion.

7. The lower heterocyclylalkyl esters of acridan-10-carboxylic acid of the structural formula

[structural formula with COO—Alkylene—Z]

wherein Z is a saturated monocyclic radical containing only the elements of carbon, hydrogen, nitrogen and oxygen attached to the alkylene radical through the nitrogen in the heterocycle.

8. The process of preparing haloalkyl esters of acridan-10-carboxylic acid which comprises reacting acridan with the haloformyl ester of a halogenated alcohol of the type halogen-alkylene—O—CO-halogen 9. The process of preparing chloroalkyl esters of acridan-10-carboxylic acid which comprises heating acridan with chloroformyl ester of a chlorinated alcohol of the type Cl-alkylene—O—CO—Cl in an inert organic solvent in which both reactants are soluble.

10. The process of preparing compounds defined as in claim 2, which comprises reacting acridan with the haloformyl ester of a halogenated alcohol of the type halogen-alkylene—O—CO-halogen and reacting the resulting haloalkyl ester of acridan-10-carboxylic acid with the corresponding amine.

11. The dimethylaminoethyl ester of acridan-10-carboxylic acid.

12. The acridan-10-carboxylates of diethylmethyl(β-hydroxyethyl)ammonium halides of the structural formula

[structural formula with COO—CH₂—CH₂—N⁺(C₂H₅)(C₂H₅)(CH₃) X⁻]

wherein X is a halide ion.

13. The β-morpholinoethyl ester of acridan-10-carboxylic acid.

14. The lower hydroxyalkylalkylaminoalkyl esters of acridan-10-carboxylic acid of the structural formula

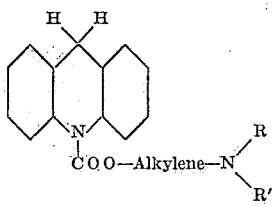

wherein R is a lower alkyl and R' is a lower hydroxyalkyl radical.

15. The lower N-(β-hydroxyethyl)-N-alkylaminoethyl esters of acridan-10-carboxylic acid of the structural formula

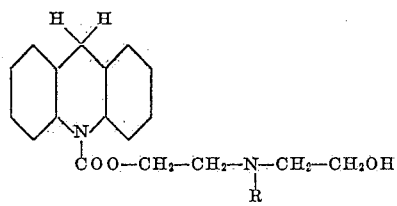

wherein R is a lower alkyl radical.

16. The lower haloalkyl ester of acridan-10-carboxylic acid.

17. The β-haloethyl ester of acridan-10-carboxylic acid.

18. The β-chloroethyl ester of acridan-10-carboxylic acid.

JOHN W. CUSIC.

REFERENCES CITED

The following references are of record in the file of this patent:

UNITED STATES PATENTS

| Number | Name | Date |
|---|---|---|
| 2,170,037 | Semon | Aug. 22, 1939 |

OTHER REFERENCES

Burtner et al., Chem. Abstracts, vol. 37, p. 5719 (1943).